Dec. 27, 1966  F. DAYES  3,294,239
AQUARIUM AERATOR
Filed March 15, 1963
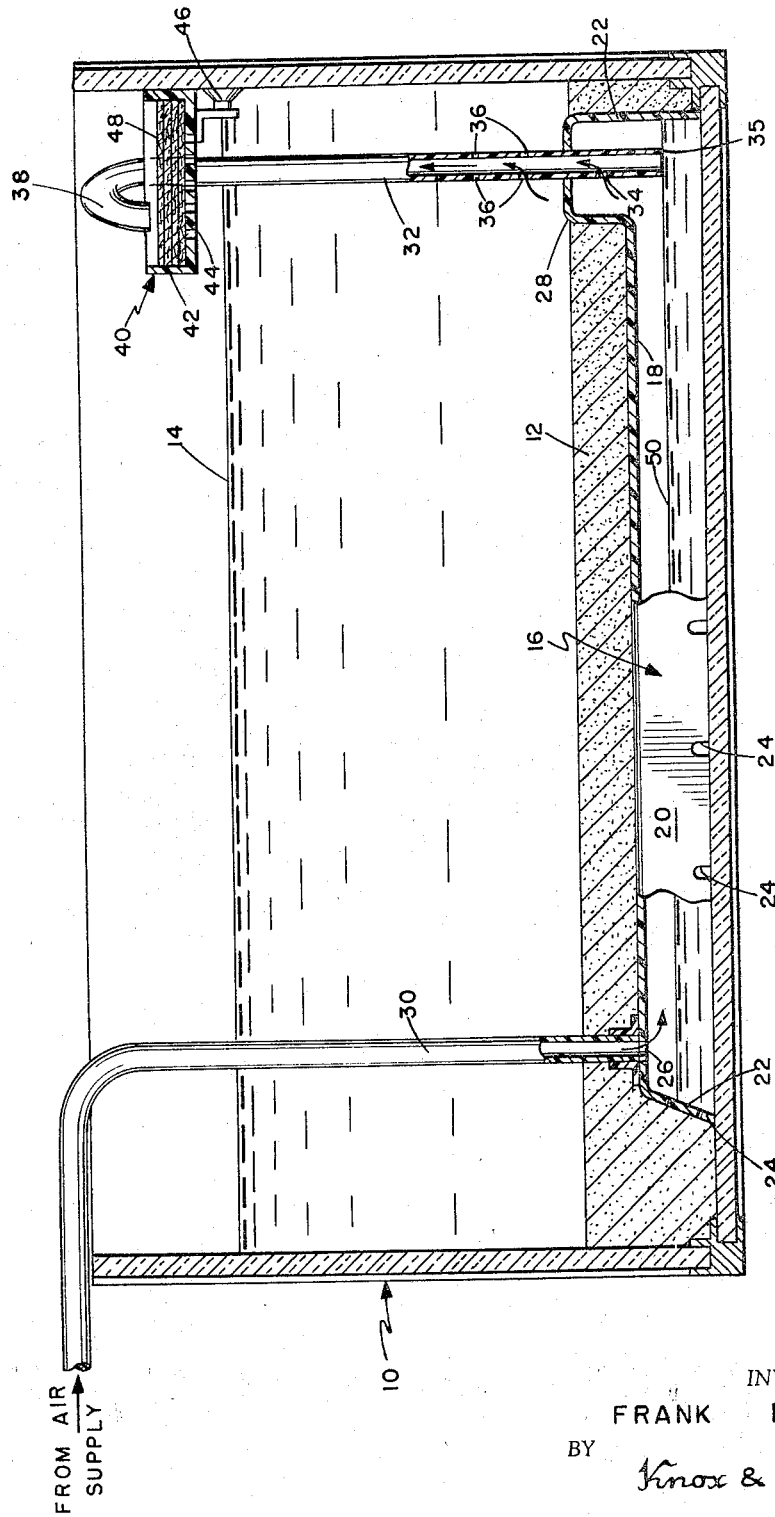
INVENTOR.
FRANK DAYES
BY
Knox & Knox

United States Patent Office 3,294,239
Patented Dec. 27, 1966

3,294,239
AQUARIUM AERATOR
Frank Dayes, 4971 Narraganset St.,
San Diego, Calif. 92105
Filed Mar. 15, 1963, Ser. No. 265,517
2 Claims. (Cl. 210—169)

The present invention relates generally to an aquarium aerator and more particularly to a system for circulating, filtering and aerating the water in aquariums.

It has long been known that the health and activity of fish kept in confined bodies of water such as domestic aquariums is dependent on the purity of the aquarium water. Aquarium water is rendered impure primarily from sewage made up of waste fish food materials and fish excreta. Various types of filters have been used to maintain the purity of the water at a constant level but these have been generally ineffective since they require frequent cleaning and/or replacement of clean filtering material.

It is also well known that the number of fish that can be maintained in an aquarium is largely determined by the area of the water-air contact surface.

It is a primary object of this invention to provide a new and novel filtering and aerating system for aquariums which will maintain the purity of the water at a high level for long periods without the necessity of frequent cleaning and replacement of the filters.

It is a further object of this invention to provide a new and novel aquarium apparatus which will increase the water-air contact surface without increasing the over-all size of the aquarium.

It is a still further object of this invention to provide a new and improved top filter for aquariums which utilizes an effective disposable filter thereby obviating the need for frequent cleaning and replacement.

Another object of this invention is to provide a simple and inexpensive device for effecting filtration, aeration and circulation of the water of an aquarium.

Finally, it is an object to provide an aquarium aerator of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

The single figure is a longitudinal sectional view of an aquarium showing the installation of the apparatus of the invention.

Referring to the drawing, the preferred form of apparatus embodying the present invention is adapted for use with a conventional aquarium 10 having a bed of sand or the like 12 in the bottom thereof. A body of liquid having a level 14 covers the bed of sand.

The novel subject matter of the present invention includes generally a subsand filter and aerator 16 and a top filter 40 in fluid communication through a conduit 32.

The subsand filter and aerator 16 includes a housing having imperforate top wall 18 having an area comparable to the water surface of the aquarium tank wherein it is to be used, side walls 20 and end walls 22. Sand bed 12 is shown completely covering the top wall 18 but this is not critical and may vary depending upon the conditions of the individual aquarium. Although no bed of sand is shown within housing 16 it is within the scope of this disclosure to provide for additional filtrations by the use of a layer of sand within filter housing 16. The bottom edges of side walls 20 and end walls 22 are provided with a series of spaces, notches or slots 24 the purpose of which will be hereinafter described.

Top wall 18 of housing 16 is provided with an opening 26 which is connected as the inlet tube 30 to a suitable air supply means such as a pump (not shown) or other source of air under pressure. Extending upwardly from the top wall 18, adjacent one end wall 22 is a hollow boss 28 which forms a support for outlet tube 32, which is press fitted or otherwise secured thereto in fluid tight engagement at 33. As will be clearly seen in the drawing the bottom 35 of tube 32 terminates at a point below the level of the inlet opening 26. An air bleed 34 provides for controlled flow of air into conduit 32.

Provision is made for by-passing the subsand filter 16 and circulating some of the aquarium water directly to top filter 40. To this end a series of holes 36 is provided in conduit 32 above the top of extension 28.

Upper end of conduit 32 is reversely turned to provide a goose neck 38 through which it discharges into top filter 40. Conduit 32 and top filter 40 are preferably located closely adjacent or in a corner of the aquarium. Any suitable means may be utilized for supporting these elements. As shown top filter 40 is supported by a bracket provided with a conventional suction cup 46. Conduit 32 may be supported directly from the aquarium wall or auxiliary supporting means may be provided on top filter 40 for this purpose.

Top filter 40 consists of a cup shaped member having side walls 42 and a perforated bottom wall 44. Disposed within this cup shaped member is a series of fiber glass filter discs 48.

Operation

My improved aerator and water conditioner is assembled and placed in position as shown in the drawing. Compressed air is then supplied to the inlet tube from a convenient source such as a conventional aquarium pump. This air under pressure depresses the level of the water in the subsand filter housing 16 until it reaches approximately to the bottom 35 of outlet tube 32. Compressed air entering the conduit 32 through bleed hole 34 will be broken up into bubbles by the action of water in the conduit. Bubbles of air will also enter the conduit through the bottom end. These bubbles will rise to the top of the conduit carrying water with them. This action is similar to that of a standard air lift pump. This air and water will be discharged through the goose neck end of conduit 32 onto top filter 40. Water is replaced in subsand filter housing 16 by seepage through sand bed 12 and through slots 24 in walls 20, 22. This will effect complete and thorough circulation of the water in the aquarium.

An essential feature of my invention is the increase in the air-water contact area through the use of subsand filter housing 16. It should be noted that there is a relatively large air-water contact area in housing 16. Available oxygen will therefore be absorbed by the water at this point greatly increasing the amount of oxygen in the water. This will permit the maintenance of a larger number of fish than would be possible if the water surface at the top of the aquarium were the only point at which oxygen could be absorbed by the water.

A further important feature of my invention is the increased effectiveness of the top filter. It should be noted that I provide by-pass openings 36 in conduit 32. Water and air moving upwardly in this conduit draw in water from the aquarium proper and carry it up to be discharged to the top filter 40. This water has suspended therein waste material and fish excreta which would normally be filtered out by the subsand filter. By removing much of this material in the top filter the necessity for frequent cleaning and/or changing of the sand in the subsand filter is largely eliminated.

The use of a plurality of stacked fiber glass discs in the top filter promotes cleanliness and provides a long lasting filter. Being above the water level of the aquarium it is readily accessible and it is a relatively simple matter to remove and discard the top filter disc 48 as soon as it becomes clogged with waste material. Cleaning and replacement of the filtering material is not necessary as is characteristic of the majority of top filters now in use.

It is understood that minor variation from the form of the invention disclosed herein may be made without departure from the spirit and scope of the invention, and that the specification and drawings are to be considered as merely illustrative rather than limiting.

I claim:

1. A filter and aerator for use in an aquarium tank containing water, a bed of comminuted particles on the floor of said tank and a source of air under pressure, said filter and aerator comprising:

an imperforate housing having a top wall of an area comparable to the water surface and side walls extending substantially normal thereto;

openings in the lower edge of said side walls to facilitate flow of liquid through the entire thickness of said bed and into said housing;

an outlet conduit having an end disposed below the level of said top wall for the discharge of liquid and air from said housing, a top filter into which said outlet tube exhausts, and said outlet tube having by-pass openings between said housing and top filter; and an air inlet tube to admit pressurized air to said housing to depress the level of the water to the end of the outlet conduit.

2. The structure of claim 1 further including an air bleed positioned in that portion of the outlet tube that is within the housing and slightly above the lower end thereof.

References Cited by the Examiner
UNITED STATES PATENTS

| | | | |
|---|---|---|---|
| 950,999 | 3/1910 | Erlwein et al. | 210—169 X |
| 1,055,082 | 3/1913 | Rogers | 210—169 X |
| 2,676,921 | 4/1954 | Vansteenkiste | 210—169 |
| 2,769,799 | 11/1956 | Vansteenskiste et al. | 210—169 X |
| 2,786,026 | 3/1957 | Stark | 210—169 |
| 3,149,609 | 9/1964 | Murphy | 119—5 |

OTHER REFERENCES

German printed application No. W 13,420, 8/1956.

REUBEN FRIEDMAN, *Primary Examiner.*

HARRY B. THORNTON, *Examiner.*

F. W. MEDLEY, *Assistant Examiner.*